W. R. SMITH.
METHOD AND MEANS FOR CONTROLLING THE FLOW IN FLUID CONDUIT SYSTEMS.
APPLICATION FILED MAY 17, 1915.
1,249,227.  Patented Dec. 4, 1917.
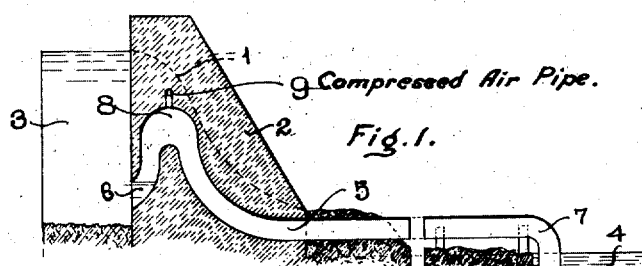
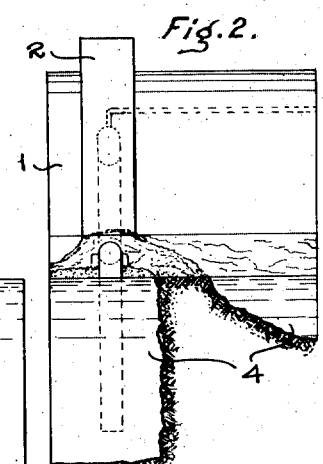
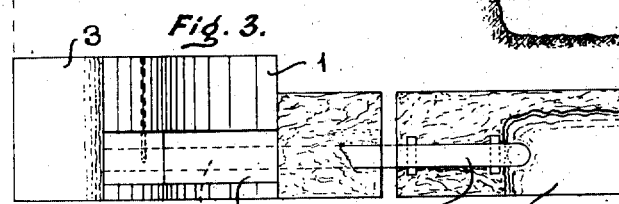
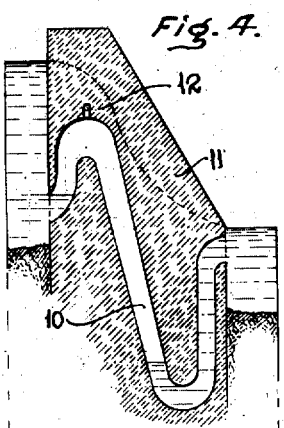
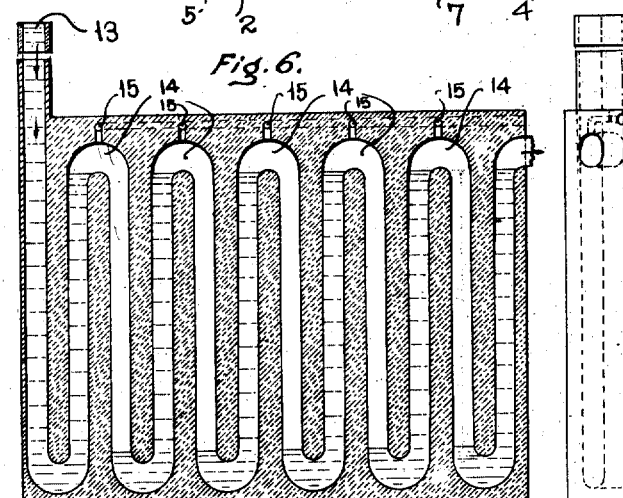
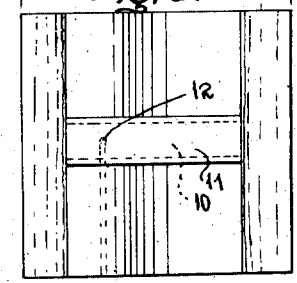
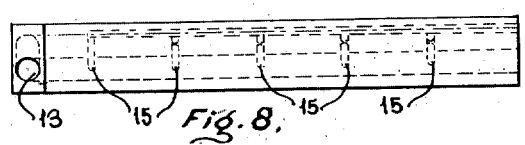

UNITED STATES PATENT OFFICE.

WILLIAM RUSSELL SMITH, OF YORK, PENNSYLVANIA.

METHOD AND MEANS FOR CONTROLLING THE FLOW IN FLUID-CONDUIT SYSTEMS.

1,249,227.          Specification of Letters Patent.          Patented Dec. 4, 1917.

Application filed May 17, 1915. Serial No. 28,741.

*To all whom it may concern:*

Be it known that I, WILLIAM RUSSELL SMITH, of York, in the county of York and State of Pennsylvania, have invented certain new and useful Improvements in Methods and Means for Controlling the Flow in Fluid-Conduit Systems; and I do hereby declare the following to be a full, clear, and exact description of the invention, such as will enable others skilled in the art to which it appertains to make and use the same.

My invention relates to an improved method and means for regulating and controlling the flow of fluid in a fluid conduit system. By the term fluid, as used in the title of my invention and hereinafter used elsewhere throughout my specification, it is to be understood that I refer to such elements or combination of elements as are capable of existence in liquid, liquid and gaseous or only gaseous form, and by fluid conduit system I refer to such systems as are used in the transportation of such fluids above-named from one point to another by flowing.

It is one of the objects of my invention to provide a method and means for regulating the flow in a fluid conduit system by the introduction of an elastic body to oppose the initial pressure inducing the flow.

Another object of my invention is the herein described method and means of regulating the flow of a fluid without resorting to valves or other mechanical checks of any description.

Still another object of my invention resides in the utilization of a pneumatic check for regulating or stopping the flow of a fluid in a fluid conduit system.

A still further object resides in the provision, in a dam, weir, flume, or the like, of a novel automatic means for relieving any undue pressure created by the fluid which would otherwise tend to impair the safety of the dam, weir, flume, or the like, such means being so arranged that the flow of water therethrough is controllable at will.

Other objects of my invention will appear in the following description of specific embodiments of the principles of my invention.

In the drawings annexed hereto and forming a part of my specification:

Figure 1 illustrates a transverse section through a dam, spillway and tail-race, embodying my invention.

Fig. 2 is an upstream view of the dam shown in Fig. 1, and showing the tail-race water in section.

Fig. 3 is a top plan view of the dam shown in Figs. 1 and 2.

Fig. 4 is a transverse section through a modification of the dam shown in Fig. 1, this dam embodying a fluid conduit or supplementary fluid passage arranged entirely within the dam.

Fig. 5 is a top plan view of the same.

Fig. 6 illustrates in cross-section a fluid conduit system, such as a pipe line, embodying a plurality of unit bends which, in the manner herein after described, act as check controlling means for the fluid.

Fig. 7 is an end view of the system shown in Fig. 6.

Fig. 8 is a top plan view of the system shown in Figs. 6 and 7.

With particular reference to Figs. 1, 2 and 3, the system as embodied in the dam shown, comprises a spillway 1, a pier 2, the headwater 3 and tail-race 4. In the pier 2 is embodied a supplementary passage or conduit 5 which is of an inverted U-shape having a shorter leg 6 submerged beneath the surface of the headwater at a point above the surface of the water in the tail-race 4, the longer leg being extended and connected with a pipe 7 which terminates below the surface of the water in the tail-race, the highest point of the bend being below the surface of the headwater under normal conditions. It will be seen from this construction that, due to the difference in pressure resulting from the difference in height between the headwater and tail-race, a flow of water will normally take place through the passage 5. At the bend 8 the cross-sectional area of the passage is greater than at any other point along the passage, in order to provide a chamber at this point. At the top point of the bend I provide a pipe 9 connected with an air pressure tank or air compressor not shown. In order to regulate the flow through the passage, air under pressure is introduced into this pipe 9 and flows therefrom to the chamber or enlarged portion at the bend 8. If the pressure of air in this chamber is increased sufficiently to overcome the pressure resulting from the difference in height between the headwater and the water in the tail-race, it will be seen that the flow of water through the passage will be stopped. If the headwashould rise to such a point that it would endanger the safety of the dam, this point being determined by the engineer constructing the dam, the air pressure in the chamber at the bend of the supplementary passage would be overcome and water would start to flow through the passage thereby relieving the strain on the dam. When the headwater flows to its normal height the flow of water through the supplementary passage could then be checked, or reduced to any flow desired by admitting air pressure to the bend through the pipe 9.

It may not at all times be convenient to provide a pipe 7, the end of which would be submerged below the water in the tail-race, and therefore in order to provide means for controlling the water of a dam in which the construction shown in Figs. 1, 2 and 3 cannot be used, I have devised the construction shown in Fig. 4, wherein the supplementary passage 10 is entirely located within the pier 11 of the dam. In this case the passage comprises at the head end an inverted U-shaped portion similar to that shown in the construction shown in Figs. 1, 2 and 3, but the longer leg is extended and bent up to a normal U-shape form, the end of which is submerged below the water in the tail-race, at a point below the head end of the passage. In this construction, means 12 are also provided for introducing air pressure into the chamber formed at the head end bend, and it will be seen that the flow of water may be regulated in a manner similar to that described in connection with the construction shown in Figs. 1, 2 and 3.

With reference to Figs. 6, 7 and 8, I have shown a construction which is suitable for long pipe line systems; the fluid enters at a point 13 and courses through a series of inverted U-shaped bends 14, air admission means 15 being provided at the top of each bend. When it is desired to regulate the flow in this system air pressure is introduced through the means 15 at the top of each bend and the fluid in each bend is depressed on one side so as to trap sufficient volume of air therein to overcome the pressure at 13 inducing the flow.

It will be evident that while I have herein described three specific forms of my invention, the principles thereof may be applied to any pipe line or fluid conduit system in which it is desired to regulate the flow of fluids. It will also be evident that by raising the pressure of the air to that point which overcomes the pressure inducing the flow, the fluid may be stopped from flowing through the system. However if it is only wished to modify the flow, the pressure of air may be maintained at a point below the pressure inducing the flow and thereby the volume of fluid flowing through the passage will be restricted.

It is to be understood that while I have herein shown specific embodiments I do not wish to be limited thereto except for such limitations as my claims may import.

I claim:

1. In combination with a fluid reservoir and a tail basin, a sloping conduit interconnecting the two to permit a normal gravity flow from the former to the latter, said conduit including an intermediate bend having its highest elevation always below the fluid level in the reservoir, the inlet and outlet ends of said conduit being constantly submerged in the fluid in the reservoir and tail basin respectively, and means for introducing a body of compressed air or the equivalent into the bend in said conduit to supplement the resistance to flow offered by the fluid in the tail basin thereby forming a back pressure equalizing the head pressure to temporarily interrupt the gravity flow through the conduit.

2. In combination, a fluid pressure supply, a conduit having one end in connection therewith, a recipient fluid pressure mass in connection with the other end of said conduit and offering a back pressure always less than the pressure of the fluid supply whereby a flow from the former to the latter normally occurs, and means for developing air pressure or the like within the conduit to supplement the back pressure offered by the recipient mass and create a resistance to equalize the pressure of the fluid supply, thereby temporarily interrupting the flow.

3. In combination, head and tail water basins having a spillway tube connecting the two, said tube having its ends submerged and provided with a bend in its intermediate portion having a peak sufficiently lower than the level of the head water to permit a normal gravity flow through the tube, and means for adding fluid pressure resistance to the resistance of the tail water to overcome the pressure of the head water and interrupt the flow through said tube.

In testimony whereof, I have signed this specification.

WILLIAM RUSSELL SMITH.

Copies of this patent may be obtained for five cents each, by addressing the "Commissioner of Patents, Washington, D. C."